Aug. 3, 1965

O. MUELLER 3,198,035

DIFFERENTIAL TRANSMISSION

Filed Aug. 16, 1963

INVENTOR.
OTTO MUELLER
BY
Olsen and Stephenson

Aug. 3, 1965 O. MUELLER 3,198,035
DIFFERENTIAL TRANSMISSION
Filed Aug. 16, 1963 4 Sheets-Sheet 2

INVENTOR.
OTTO MUELLER
BY
Olsen and Stephenson

Aug. 3, 1965   O. MUELLER   3,198,035
DIFFERENTIAL TRANSMISSION
Filed Aug. 16, 1963   4 Sheets-Sheet 3
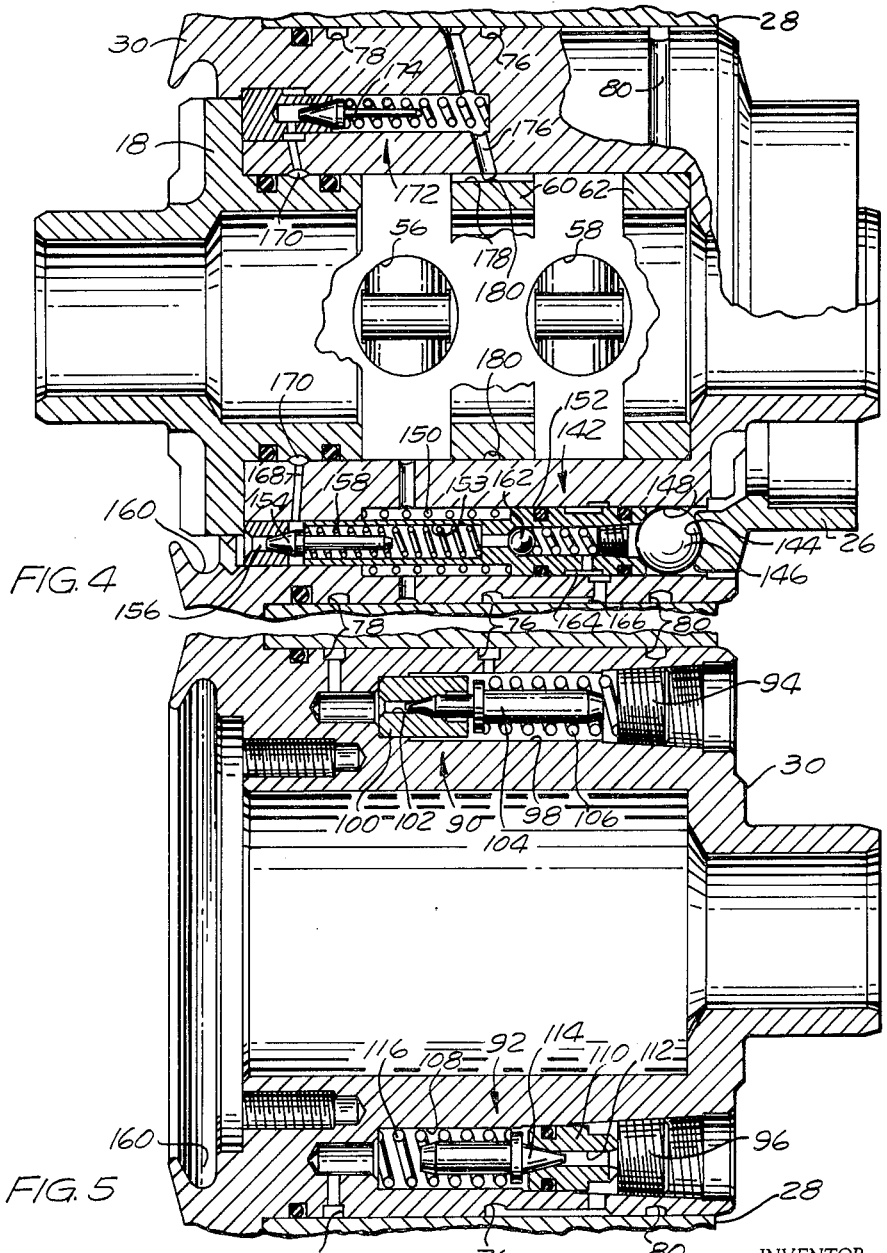
INVENTOR.
OTTO MUELLER
BY
Olsen and Stephenson INVENTOR.
OTTO MUELLER
BY
Olsen and Stephenson

United States Patent Office 3,198,035
Patented Aug. 3, 1965

3,198,035
DIFFERENTIAL TRANSMISSION
Otto Mueller, 13 Byfield Lane, Dearborn, Mich.
Filed Aug. 16, 1963, Ser. No. 302,545
13 Claims. (Cl. 74—650)

The present invention relates to a transmission adapted primarily, but not exclusively, for use with motor vehicles. The present invention may be used as a locking-type differential transmission for a two wheel drive or two of such transmissions may be used to provide a four wheel drive. This invention relates to the invention of prior U.S. application, Ser. No. 284,646, filed May 31, 1963.

The differential transmissions now in use in the automobile industry employ a set of differential gears in a casing to allow differential action between the driven wheels of the vehicles. This use of differential gears occurs essentially in all makes of automobiles irrespective of whether conventional differential transmissions are used or whether some form of a locking-type differential transmission is employed.

As is well known, the conventional differential transmission heretofore used in the automobile industry has an inherent defect in that the driving torque is transmitted under certain circumstances wholly to the wheel of the vehicle which has the least traction. This loss of power to the other wheel occurs, for example, when the wheel with less traction is on ice, in mud, or the like where it can spin freely. Considerable efforts have been made for a number of years in the automobile industry to develop an improved differential transmission which can overcome this defect and which will provide controlled torque to both driven wheels while still assuring that proper differential action between the driven wheels will occur when required, but such efforts have not been entirely successful.

The differential transmission disclosed in the aforesaid prior application, Ser. No. 284,646, overcomes many of the shortcomings of the prior art, particularly when used in a motor vehicle having a two wheel drive. The differential transmission illustrated in that application can be used for four wheel drive vehicles, but when so used one unit must be provided for the rear axle, a second unit must be provided for the front axle and a third differential unit must be provided for the drive shaft assembly operatively connecting the front and rear axle assemblies. The need for the differential unit for the front axle is the same as that for the rear axle, namely, to allow for differential action between the driven wheels of the axle assembly. The need for the third differential unit in the drive shaft assembly is not so obvious, but it is found that such a unit is required if means are not otherwise present to accommodate for greater or lesser turning of the front wheels relative to the rear wheels, or in other words, means must be provided to prevent winding of the drive shaft assembly between the front and rear axles. If no such means are provided, it is found that such winding will occur and will be released periodically with a snap when the torque resulting from such winding action overcomes the frictional resistance on the ground of the front or rear wheels, causing the front or rear sets of wheels to spin a limited amount relative to the other.

This problem of compensating for the winding of the drive shaft assembly is inherent in all differential transmissions using differential gearing, because, while the differential gears allow differential turning of the wheels on the same axle assembly, such gears will, in effect, provide a direct drive connection between its axle assembly and a drive shaft assembly, because both of the axle shafts are always in a direct gear drive with the drive shaft and no slippage can occur in such direct gear drive. Thus, when in a four wheel drive, differential gearing is used in conjunction with the front and rear axles, a direct drive between these axles is provided, and a third means must be provided to compensate for such differential action that may occur between the front and rear axle assemblies.

It is an object of the present invention to provide an improved differential transmission which is constructed and arranged so that it can be used in the front axle assembly of a four wheel drive vehicle and which will function to eliminate the need for a separate differential unit between the front and rear axle assemblies.

It is another object of the present invention to provide an improved differential transmission of the foregoing character which can be used in both the front and rear axle assemblies of a four wheel drive vehicle, eliminating the need for a separate differential unit between the front and rear axle shaft assemblies, and which can also be used as the differential transmission in a two wheel drive vehicle.

It is still another object of the present invention to provide an improved differential transmission of the foregoing character which employs a hydraulic mechanism for controlling and distributing torque to each of the driven wheels associated with the transmission and which is adapted to use the fluid from the differential case for this purpose and to replenish itself when required because of loss of fluid through leakage, or the like.

It is another object of the present invention to provide an improved differential transmission of the foregoing character which is constructed and arranged so that the hydraulic mechanism is operably disposed between the differential casing and each of two different rotary elements, and the transmission is characterized by the effective and simple manner in which the mechanism is assembled as a part of the transmission.

It is still another object of the present invention to provide a hydraulically actuated differential transmission which is constructed and arranged so that it is statically and dynamically balanced and has various components constructed so that a relatively long and trouble-free life of the transmission is assured.

It is still another object of the present invention to provide an improved differential of the foregoing character in which the hydraulic mechanism is constructed and arranged to allow limited turning of the differential casing relative to the two driven shafts of the axle assembly when such two driven shafts are turning as a single unit, the rate of such relative turning being controlled by interchangeable flow control means in the hydraulic circuit of the hydraulic mechanism.

It is still another object of the present invention to provide an improved differential transmission of the foregoing character wherein interchangeable flow control members are provided in the hydraulic mechanism for controlling the torque distribution to the driven wheels.

It is still another object of the present invention to provide an improved differential transmission which is constructed and arranged so that its external dimensions will conform generally to those of the prior conventional differential transmissions, including the differential transmission disclosed in aforesaid application, Ser. No. 284,646, making the present differential transmission readily interchangeable with said prior transmissions or making parts of the present transmission interchangeable with corresponding parts of the transmission disclosed in the aforesaid application, Ser. No. 284,646.

Other objects of this invention will appear in the following description and appended claims, reference being had to the accompanying drawings forming a part of this specification wherein like reference characters designate corresponding parts in the several views.

In the drawings:

FIGURE 4 is a fragmentary front elevation with a major portion in section taken on the line 4—4 of FIGURE 2;

FIGURE 5 is a fragmentary section of the casing taken on the line 5—5 of FIGURE 2;

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
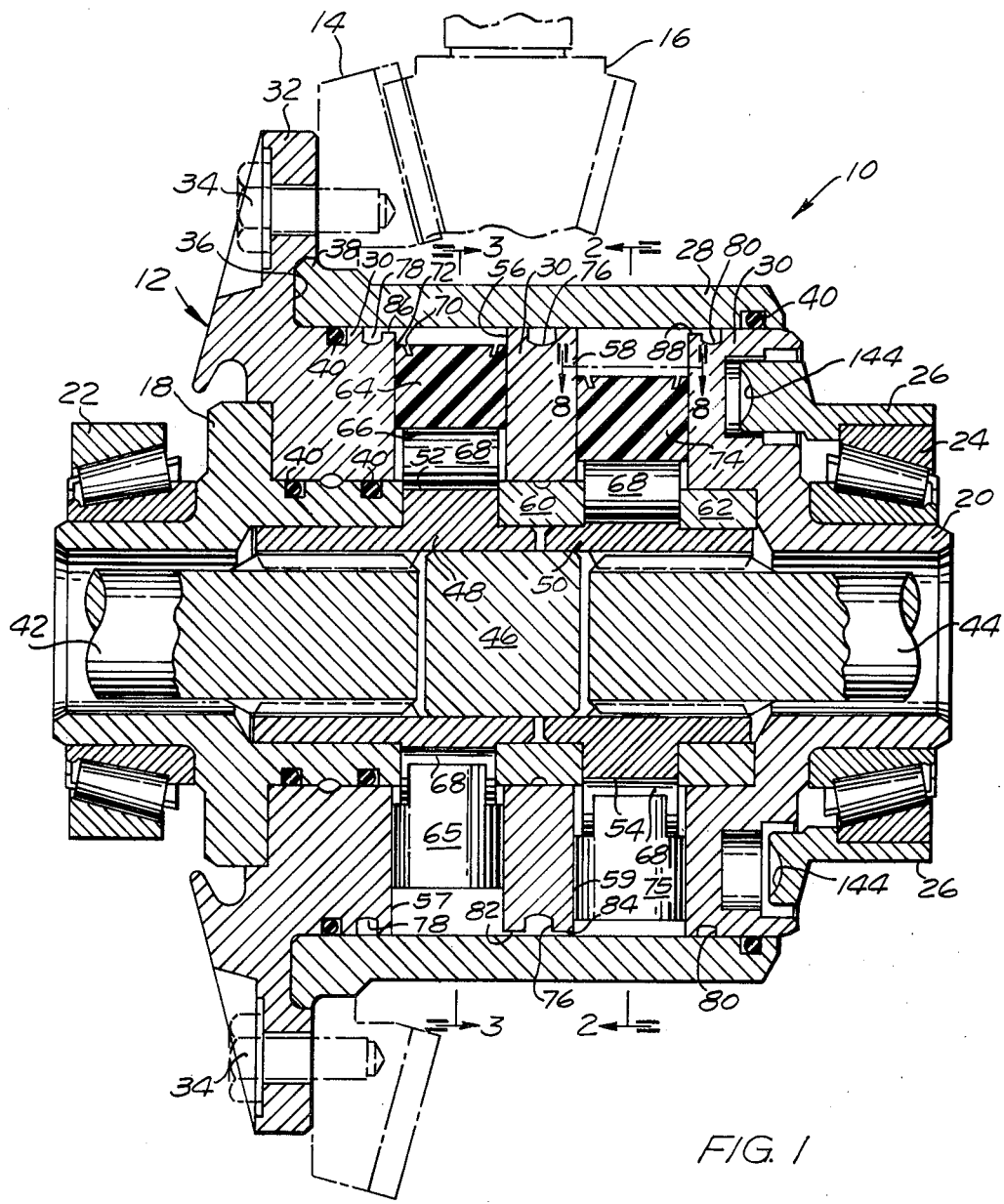
FIGURE 1 is a sectional view taken on line 1—1 of FIGURE 2 of a transmission embodying the present invention.

Referring to the drawings, the illustrated embodiment of the invention will be described in greater detail. The differential transmission 10 has a casing 12 which supports in the conventional manner a ring gear 14 which is adapted to be driven by a drive pinion 16. The casing 12 has hollow stems 18 and 20 which are mounted in bearings 22 and 24. As shown in FIGURE 1, the hollow stem 18 is separable from the remainder of casing 12 for the purpose of assembling internal parts of the transmission 10. Bolts (not shown) hold these parts 12 and 18 together.

The bearing 24 is mounted in a cap 26 which is adapted to be mounted and held stationary in a conventional differential housing (not shown). Similarly, the outer race of the bearing 22 is adapted to be held stationary in the differential housing (not shown).

The casing 12 has a radially outer portion 28 and a radially inner portion 30 which are secured together at the same time that the ring gear 14 is secured to the casing flange 32 by the plurality of bolts 34. As shown in FIGURE 1, the flange 32 has an annular groove 36 for receiving one end of the radially outer portion 28, and the latter has a radially outwardly projecting shoulder 38 against which the ring gear 14 fits to hold the radially outer portion 28 in place on the radially inner portion 30. A plurality of O-rings 40 are provided between the various parts described above to assure that the joints between these parts are sealed for purposes to be described.

Extending into the opposite ends of the casing 12 are axle shafts 42 and 44 which are externally splined on their inner ends in the conventional manner. A conventional spacer element 46 is provided therebetween. Mounted within the casing 12 for rotation relative to the casing 12 about its axis are two axially aligned rotatable elements 48 and 50 which are hollow and are internally splined for receiving the externally splined ends, respectively, of axle shafts 42 and 44. Thus, rotatable element 48 and axle shaft 42 turn as a unit and rotatable element 50 and axle shaft 44 turn as another unit.

Figure 2:
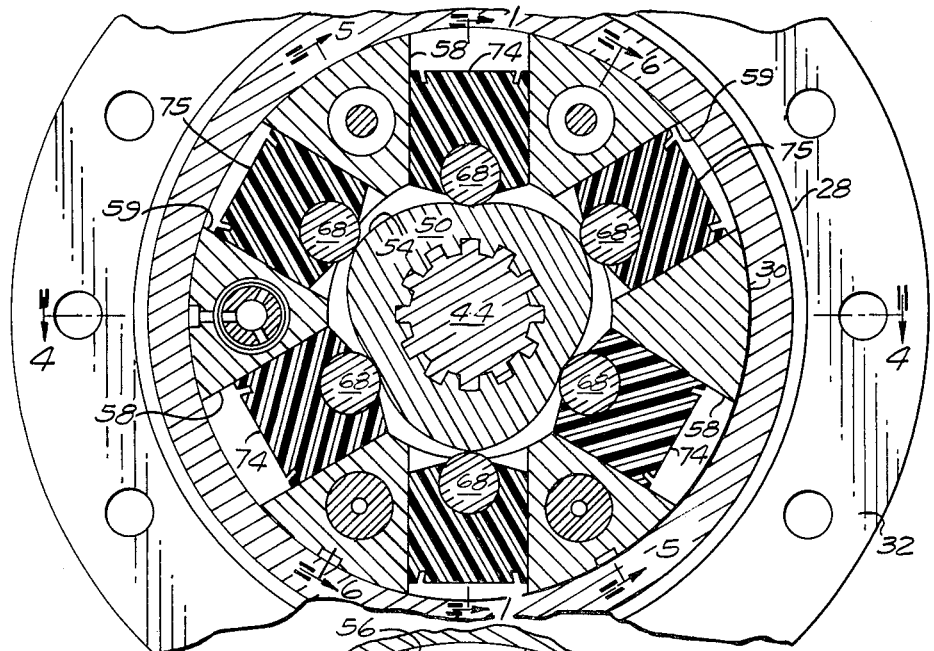
FIGURE 2 is a fragmentary section taken on the line 2—2 of FIGURE 1.
Figure 3:
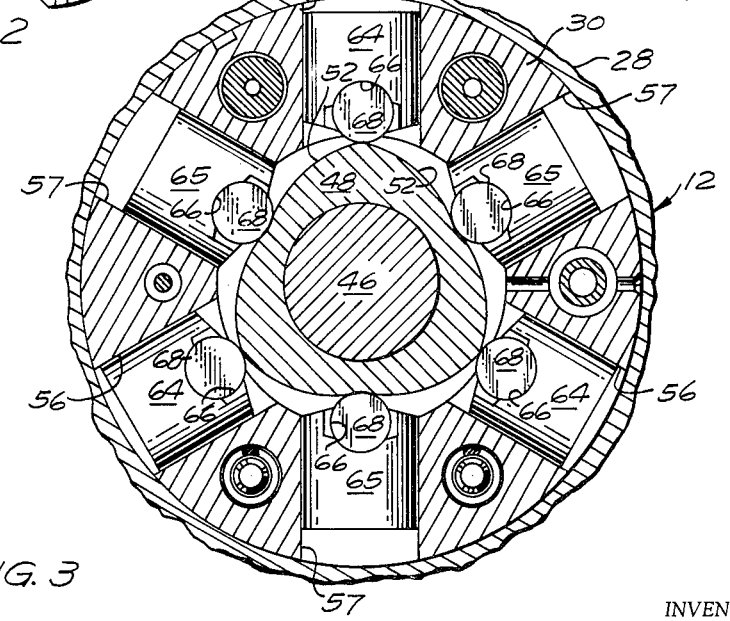
FIGURE 3 is a fragmentary section taken on the line 3—3 of FIGURE 1.

Rotatable element 48 has formed around a portion of its periphery three radially outwardly directed rise and fall cam surfaces 52 (FIGURE 3), and similarly, rotatable element 50 also has around a portion of its periphery three similar rise and fall cam surfaces 54 (FIGURE 2).

The radially inner portion 30 of the casing 12 has, in axially spaced relation, two groups of circumferentially aligned and radially inwardly directed pressure chambers 56, 57 and 58, 59. The group of pressure chambers 56, 57 are six in number and face the rise and fall cam surfaces 52, and the group of pressure chambers 58, 59 also six in number and face the rise and fall cam surfaces 50. The cam surfaces 52 and 54 are maintained in proper alignment with their associated pressure chambers 56, 57 and 58, 59 by the spacer rings 60 and 62 which are assembled in their illustrated (FIGURE 1) positions by insertion through the end of casing 12 occupied by the separable hollow stem 18.

Figure 8:
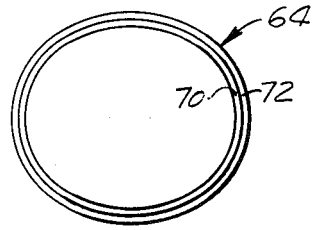
FIGURE 8 is an enlarged plan view of the pistons in the hydraulic mechanism as seen in the direction of the arrows 8—8 in FIGURE 1.

Positioned in each of the pressure chambers 56 are pistons 64 and in the pressure chambers 57 are similar pistons 65. The pistons 64, 65 have formed in their inner ends transverse notches 66 in which are seated the followers or rollers 68. The latter are adapted to follow or roll on the rise and fall cam surfaces 52 for effecting reciprocal movements of the pistons 64, 65 in the pressure chambers 56, 57. As shown in FIGURE 4, the pressure chambers are elliptical in cross section and the minor axis of each ellipse extends parallel to the axis of the casing 12. The pistons 64, 65 are also elliptical in shape, as shown in FIGURE 8, and the notches 66 are arranged in pistons 64, 65 so that the axis of each follower or roller 68 is also parallel to the axis of casing 12. By virtue of these constructions and arrangements, the followers or rollers 68 will roll smoothly on the cam surfaces 52 and no problem will arise from the pistons 64, 65 turning on their individual axes.

The pistons 64, 65 are constructed also so as to maintain a seal between themselves and the walls of the pressure chambers 56, 57. In the illustrated embodiment of the invention the pistons 64, 65 are made from a suitable plastic material and a groove 70 is located in the top wall thereof so as to provide a generally outwardly flared lip 72. When the pistons 64, 65 move outwardly in the pressure chambers 56, 57 the lips 72 are designed to maintain the desired seal for a purpose to be described.

A detailed description of pressure chambers 58, 59 and their associated pistons 74, 75 is not believed necessary because these parts are essentially the same as corresponding pressure chambers 58, 59 and pistons 64, 65, previously described.

From the foregoing description it can be understood that when an input torque is imparted to the casing 12 by means of the drive pinion 16 and the ring gear 14, the pressure chambers 56, 57 and 58, 59, which are an integral part of casing 12, will travel therewith. This has the effect of moving the followers 68 on the respective cam surfaces 52 and 54 of rotatable elements 48 and 50. By controlling the rate of reciprocation of pistons 64, 65 and 74, 75 that can occur, the portion of the input torque to the casing 12 can be distributed in controlled amounts to the rotatable elements 48 and 50, and thereby to the axle shafts 42 and 44. Also, because this construction and arrangement permits a controlled amount of slippage to occur simultaneously between the casing 12 and both rotatable elements 48 and 50, it is possible to use the present invention as the differential for the front axle assembly of a four wheel drive vehicle and the slippage will accommodate any winding-up that may occur in the drive assembly interconnecting the front and rear wheel axle assemblies.

Figure 7:
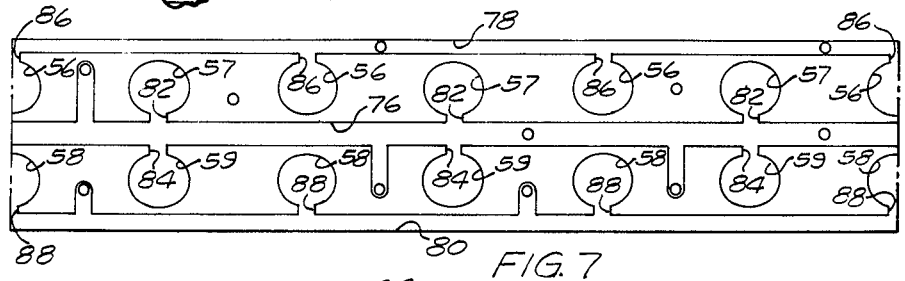
FIGURE 7 is a developed view of the fluid passages for the hydraulic mechanism of the present invention.

The construction and arrangement for controlling the rate of reciprocation of the pistons 64, 65 and 74, 75 will now be explained. Formed between the radially inner and outer portions 28 and 30 are three annular grooves 76, 78 and 80. These grooves and their relationship to one another and to the pressure chambers 56, 57 and 58, 59 can be seen in the developed illustration in FIGURE 7. As there shown, annular groove 76 communicates via ducts 82 with pressure chambers 57 of the group of pressure chambers 56, 57 and via ducts 84 with pressure chambers 59 of the group of pressure chambers 58, 59. The second annular groove communicates via ducts 86 with pressure chambers 56, and the third annular groove 80 communicates via ducts 88 with pressure chambers 58.

For the purpose of describing the construction and operation of this portion of the invention, the group of pressure chambers 56, 57 and their associated parts for transmitting torque from casing 12 to axle shaft 42 will be described first. For this purpose attention is directed primarily to FIGURES 1, 3, 5 and 8. As shown particularly in FIGURE 5, the annular grooves 76 and 78 are in controlled fluid communication at the passage means 90 and 92. Access to both of these passage means can be gained by removal of the plugs 94 and 96 located in the end of the radially inner portion 30 of casing 12.

Passage means 90 includes the passageway 98 extending between grooves 76 and 78 and in which is located a fluid flow control member 100 in through which is a restricted orifice 102. A spring actuated check valve element 104 is urged into the flow orifice 102 by the compression spring 106. By virtue of this arrangement fluid can flow from annular groove 78 to annular groove 76 but not in a reverse direction.

Passage means 92 operates in the reverse manner to allow one way flow of fluid from annular groove 76 to annular groove 78. Passage means 92 includes a passageway 108 extending between grooves 76 and 78 and in which is located a fluid flow control member 110 through which is a restricted orifice 112. A spring actuated check valve element 114 is urged into the flow orifice 112 by compression spring 116.

Thus, when the pressure chambers 56, 57 and the annular grooves 76 and 78 as well as the ducts 82 and 86 and the passageways 98 and 108 are full of hydraulic fluid, a closed hydraulic system is provided and the rate at which the pistons 64, 65 can reciprocate is governed by the rate at which the hydraulic fluid can reciprocate back and forth through the flow control orifices 102 and 112.

Figure 6:
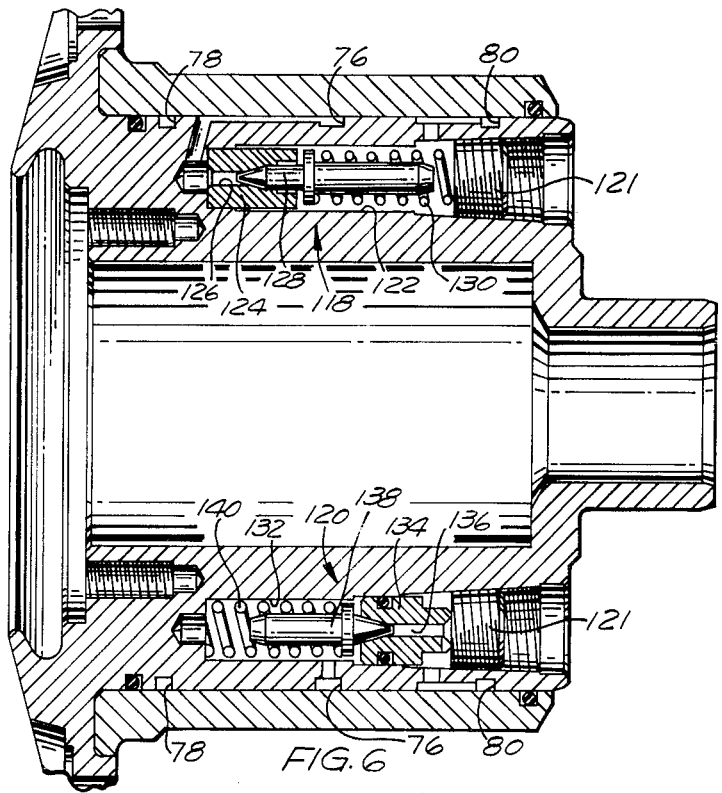
FIGURE 6 is a fragmentary section of the casing taken on the line 6—6 of FIGURE 2.

The construction and operation of the hydraulic mechanism operatively connecting the casing 12 with the axle shaft 44 is similar to that which has just been described relative to shaft 42. With particular attention to FIGURE 6, it can be seen that the pressure chambers 58 are connected to the pressure chambers 59 by two passage means 118 and 120. Access to passage means 118 and 120 can be gained by removal of the plugs 121. Passage means 118 has a passageway 122, a fluid flow control member 124 with a restricted orifice 126, check valve element 128 and compression spring 130. Similarly, passage means 120 has a passageway 132, a flow control member 134 with a restricted orifice 136, a check valve element 138 and a compression spring 140. Thus, when the pressure chambers 58, 59 and their associated grooves 76 and 80, ducts 84 and 88 and passageways 122 and 132 are filled with hydraulic fluid, a closed system is provided for pumping such fluid back and forth between the pressure chambers 58 and 59 when the pistons 74, 75 are caused to reciprocate by relative turning between the casing 12 and the rotatable element 50 and its associated axle shaft 44.

From the foregoing description it can be understood that the rotatable elements 48 and 50 and their associated hydraulic mechanisms connecting them to casing 12 operate substantially independently of one another, and both hydraulic mechanisms are designed to allow simultaneously a small amount of turning of the casing 12 relative to both rotatable elements 48 and 50 and their associated shafts 42 and 44.

It is recognized that events may occur, such as leakage or the like, to cause a partial loss of fluid from the pressure chambers to the casing 12 or the differential housing (not shown). To prevent such leakage O-rings have been used to minimize this problem. Also, pump means 142 (FIGURE 4) have been provided to compensate for any such leakage that may occur and to assure that the hydraulic system of the differential 10 is always kept full.

Referring to FIGURES 1 and 4, this feature of the invention will be described. As there shown, the stationary cap 26 has an annular cam groove 144 in which is adapted to travel a ball 146 which is located in the bore 148. Urged against ball 146 by compression spring 150 is a reciprocating pump element 152. The latter has at its opposite end a hollow cavity 153 in which is carried a valve element 154 urged into pump inlet 156 by the compression spring 158. The pump inlet 156 is in direct communication with the groove 160 on the external side of casing 12 so that it will always be partially filled, at least, with hydraulic fluid or lubricating oil from the housing (not shown) for the differential 10. Thus, when the pump element 152 is moved to the right (as seen in FIGURE 4), by action of spring 150 and travel of ball 146 on cam groove 144, hydraulic fluid will be drawn into the reduced left end portion of bore 148 and on the return stroke (to the left) such fluid will be trapped in the reduced end of bore 148 because spring 158 will return valve element to its position over pump inlet 156. At this point in the stroke to the left, if there is a shortage of hydraulic fluid in groove 76, the pressure differential between groove 76 and the cavity 153 will cause the compressed fluid to urge ball check element 162 from its seat and such fluid will flow via enlarged port 164 and passageway 166 to groove 76.

If the groove 76 and the spaces with which it is in communication are full of hydraulic fluid, such fluid will prevent ball check element 162 from opening, and on the stroke to the left of pump element 152 the fluid trapped in cavity 153 and the reduced end of bore 148 will flow through duct 168 and annular groove 170 to the by-pass valve 172 for directing the fluid to the internal parts of the differential 10 for lubricating the same. For this purpose, the fluid flows past the spring urged check valve element 174 through the ducts 176, 178 and 180.

Thus, whenever casing 12 is rotating relative to the differential housing (not shown) there will be a pumping action occurring which will replenish any fluid lost from the hydraulic systems described, and continuous forced lubrication of the internal parts of the differential 10 will occur.

As can be readily understood, the described differential 10 will function to allow differential action between the axle shafts 42 and 44 when the rate of relative turning between the axle shafts 42 and 44 does not exceed the rate of allowed turning of rotatable elements 48 and 50. The rate of allowed turning is controlled by the rate at which the pistons 64, 65 and 74, 75 can pump fluid through the control orifices 102, 112 and 126, 136.

It can be seen that the described differential can be made small in size so as to occupy the space occupied by conventional differentials, and it also utilizes two groups of hydraulic pistons and related structures which are similar to those employed in the differential gear type differential transmission shown in aforesaid application, Ser. No. 284,646 and some of the parts of the present differential can be made interchangeable with corresponding parts of the aforesaid gear type differential transmission for convenience and low cost of production when a four wheel drive vehicle is built employing the present differential for the front axle assembly and the gear type differential of the aforesaid application for the rear axle assembly.

Having thus described my invention, I claim:

1. A transmission comprising a rotatable casing for transmitting an input torque, a pair of coaxially aligned rotatable elements mounted in said casing and adapted to be connected respectively to a pair of shafts, each of said elements having a plurality of circumferentially arranged and radially outwardly directed rise and fall cam surfaces, said casing having means defining in axially spaced relation two groups of circumferentially aligned and radially inwardly directed pressure chambers, one of said groups facing the cam surfaces of one of said elements and the other of said groups facing the cam surfaces of the other of said elements, the pressure chambers of said two groups each being in two sets, restrictive passage means associated with each group providing fluid communication in each group between the two sets of pressure chambers thereof, pistons in said two groups of pressure chambers operatively engaging the cam surfaces that are faced by their respective groups of pressure chambers for reciprocation in response to rotation of their associated elements relative to said casing, said two groups of pressure chambers and their associated cam surfaces being arranged so that when relative rotation occurs between said casing and either of said elements the pistons associated with the cam surfaces of such element reciprocate to transfer the fluid in the associated group of pressure chambers back and forth between its two sets via the associated passage means.

2. A transmission comprising a rotatable casing for transmitting an input torque, a pair of coaxially aligned rotatable elements mounted in said casing and adapted to be connected respectively to a pair of shafts, each of said elements having a plurality of circumferentially arranged and radially outwardly directed rise and fall cam surfaces, said casing having means defining in axially spaced relation two groups of circumferentially aligned and radially inwardly directed pressure chambers, one of said groups facing the cam surfaces of one of said elements and the other of said groups facing the cam surfaces of the other of said elements, the pressure chambers of said two groups each being in two sets, restrictive passage means associated with each group providing fluid communication in each group between the two sets of pressure chambers thereof, pistons in said two groups of pressure chambers operatively engaging the cam surfaces that are faced by their respective groups of pressure chambers for reciprocation in response to rotation of their associated elements relative to said casing, said two groups of pressure chambers and their associated cam surfaces being arranged to that when relative rotataion occurs between said casing and either of said elements the pistons associated with the cam surfaces of such element reciprocate to transfer the fluid in the associated group of pressure chambers back and forth between its two sets via the associated passage means, reciprocating pump means mounted in said casing in communication with said passage means for replenishing losses of fluid that may have occurred from said pressure chambers or said passage means, and pump actuating means for effecting reciprocation of said pump means including a cam follower extending through one end of said casing and adapted to reciprocate and an annular cam mounted adjacent to said one end of said casing and adapted to be held stationary relative to said casing.

3. A transmission comprising a rotatable casing for transmitting an input torque, a pair of coaxially aligned rotatable elements mounted in said casing and adapted to be connected respectively to a pair of shafts, each of said elements having a plurality of circumferentially arranged and radially outwardly directed rise and fall cam surfaces, said casing having means defining in axially spaced relation two groups of circumferentially aligned and radially inwardly directed pressure chambers, one of said groups facing the cam surfaces of one of said elements and the other of said groups facing the cam surfaces of the other of said elements, the pressure chambers of said two groups each being in two sets, restrictive passage means associated with each group providing fluid communication in each group between the two sets of pressure chambers thereof, pistons in said two groups of pressure chambers operatively engaging the cam surfaces that are faced by their respective groups of pressure chambers for reciprocation in response to rotation of their associated elements relative to said casing, said two groups of pressure chambers and their associated cam surfaces being arranged so that when relative rotation occurs between said casing and either of said elements the pistons associated with the cam surfaces of such element reciprocate to transfer the fluid in the associated group of pressure chambers back and forth between its two sets via the associated passage means, and flow control means removably mounted in the portions of said passage means associated with each group for selectively setting the rate of flow of fluid through such portions of said passage means in accordance with the relative turning of said casing with respect to said elements.

4. A transmission comprising a rotatable casing for transmitting an input torque, a pair of coaxially aligned rotatable elements in said casing, one of said rotatable elements and said casing being operatively connected by fluid pressure means for transmission of torque, said one element and said casing having radially facing circumferential portions, one of said portions including a plurality of radially opening pressure chambers facing the other portion and adapted to contain fluid, the other of said portions including radially directed rise and fall cam surfaces, pistons in said pressure chambers operatively engaging said cam surfaces for reciprocation in response to rotation of said one element relative to said casing, said pressure chambers and said cam surfaces being arranged so that certain of said pistons reciprocate out of phase with other of said pistons during relative rotation of said one element relative to said casing, and passage means providing restricted fluid communication between the pressure chambers containing said certain pistons and the pressure chambers containing said other pistons, and the other of said rotatable elements and said casing being similarly operatively connected by fluid pressure means for transmission of torque.

5. A transmission as claimed in claim 4 wherein said cam surfaces are arranged relative to said pressure chambers so that relative turning of said one element relative to said casing will effect reciprocation of said certain pistons one hundred eighty degrees out of phase with said other pistons.

6. A transmission as claimed in claim 4 including pump means in communication with said pressure chambers and responsive to rotation of said transmission for urging fluid from an external source to said pressure chambers for replenishing losses of fluid that may have occurred from said pressure chambers or said passage means.

7. A transmission as claimed in claim 6 includes bypass means in communication with said pump means and having a discharge outlet in communication with the interior of said casing so that fluid passing through said by-pass means can lubricate said rotatable elements and their associated parts.

8. A transmission comprising a rotatable casing for transmitting an input torque, a pair of coaxially aligned rotatable elements in said casing, one of said rotatable elements and said casing being operatively connected by fluid pressure means for transmission of torque, said fluid pressure means including a plurality of dynamically and statically balanced circumferentially arranged and radially outwardly directed rise and fall cam surfaces on said one element, means integral with said casing defining a plurality of circumferentially aligned and radially inwardly directed pressure chambers arranged relative to the axis of the casing for static and dynamic balance and facing said cam surfaces and adapted to contain fluid, said pressure chambers numbering twice the raised cam surfaces and comprising two sets, one set being alternate ones of said pressure chambers and the other set being the other alternate ones of said pressure chambers, pistons in said pressure chambers operatively engaging said cam surfaces for reciprocation in response to rotation of said one element relative to said casing, passage means providing fluid communication between said two sets of pressure chambers, and flow control means in said passage means for controlling the rate of fluid flow between said sets of pressure chambers and thereby for controlling the permitted rate of reciprocation of said pistons, and the other of said rotatable elements and said casing having similar fluid pressure means operatively connecting them for transmission of torque.

9. A transmission comprising a rotatable casing for transmitting an input torque, said casing having an inner portion through which extend two parallel groups of radially arranged pressure chambers and an outer portion enclosing the inner portion and the radially outer ends of said pressure chambers, a pair of rotatable elements coaxially aligned in said casing, each of said elements having a plurality of circumferentially arranged and radially outwardly directed rise and fall cam surfaces, the cam surfaces of one of said elements facing the pressure chambers of one of said groups and the cam surfaces of the other element facing the pressure chambers of the other group, pistons in said two groups of pressure chambers operatively engaging the cam surfaces that are faced by their respective groups of pressure chambers for reciprocation in response to rotation of their associated elements relative to said casing, said inner and outer portions defining between them first, second and third circumferential ducts the first of which is in communication with certain of the pressure chambers of both groups and the second and third of which are in communication only with the other of the pressure chambers of the one group and the other group respectively, and separate flow control means between said first duct and each of said second and third ducts and operable for controlling the rate of flow of fluid reciprocating between said certain pressure chambers and said other pressure chambers in each group.

10. A transmission as claimed in claim 9 wherein said separate flow control means are removably mounted to permit insertion of flow control means of selected capacity.

11. A transmission as claimed in claim 9 including pump means in communication with said first circumferential duct for pumping fluid thereto for replenishing fluid losses from said pressure chambers or said ducts.

12. A differential transmission comprising a rotatable casing for transmitting an input torque, a set of rotatable differential elements mounted in said casing, one of the rotatable elements of said set having a plurality of circumferentially arranged and radially outwardly directed rise and fall cam surface, said casing having means defining a plurality of circumferentially arranged and radially inwardly directed pressure chambers facing said cam surfaces and adapted to contain fluid, said chambers having elliptical cross sections with one of their elliptical axes parallel to the axis of said casing, said pressure chambers being in two sets, passage means providing fluid communication between the two sets of pressure chambers, pistons of elliptical cross sections in said pressure chambers and supporting roller cam followers operatively engaging said cam surfaces for reciprocation of said pistons in response to rotation of said one element relative to said casing, said followers having their axes parallel to the axis of said casing, said pressure chambers and said cam surfaces being arranged so that when relative rotation occurs between said casing and said one element the pistons reciprocate to transfer the fluid in the chambers back and forth therebetween via said passage means.

13. A transmission comprising a rotatable casing for transmitting an input torque, a pair of elements mounted in said casing for independent rotation relative to one another for receiving portions of the input torque, a pair of axle shafts operatively connected for differential action to said rotatable elements, a torque transmitting mechanism operatively disposed between said casing and each of said elements for transmitting portions of said input torque from said casing to each of said elements, said torque transmitting mechanism allowing limited rotation of said casing relative to both of said elements simultaneously at low rates of turning of said casing relative to said elements being responsive to progressively increasing rates of turning of said casing relative to each element to progressively increase the torque transmission to such element.

References Cited by the Examiner

UNITED STATES PATENTS

| | | | |
|---|---|---|---|
| 1,420,798 | 6/22 | Weston | 74—650 |
| 1,429,100 | 9/22 | Ross | 74—650 |
| 2,978,929 | 4/61 | Roberts | 74—711 |

FOREIGN PATENTS 535,077  3/41  Great Britain.

DON A. WAITE, *Primary Examiner.*

UNITED STATES PATENT OFFICE
CERTIFICATE OF CORRECTION

Patent No. 3,198,035                                            August 3, 1965

Otto Mueller

It is hereby certified that error appears in the above numbered patent requiring correction and that the said Letters Patent should read as corrected below.

Column 10, line 32, after "elements" insert -- and --.

Signed and sealed this 15th day of February 1966.

(SEAL)
Attest:

ERNEST W. SWIDER                                      EDWARD J. BRENNER
Attesting Officer                                        Commissioner of Patents